United States Patent
Yuasa et al.

(10) Patent No.: US 10,308,124 B2
(45) Date of Patent: Jun. 4, 2019

(54) POWER RECEPTION APPARATUS AND POWER TRANSMISSION APPARATUS

(71) Applicants: TOYOTA JIDOSHA KABUSHIKI KAISHA, Toyota-shi, Aichi-ken (JP); YAZAKI CORPORATION, Tokyo (JP)

(72) Inventors: Hiroaki Yuasa, Miyoshi (JP); Nobuhiro Kibudera, Nagoya (JP); Syuhei Ejima, Toyota (JP); Satoru Horiuchi, Susono (JP); Kazuyoshi Kagami, Susono (JP)

(73) Assignees: TOYOTA JIDOSHA KABUSHIKI KAISHA, Toyota (JP); YAZAKI CORPORATION, Tokyo (JP)

( * ) Notice: Subject to any disclaimer, the term of this patent is extended or adjusted under 35 U.S.C. 154(b) by 231 days.

(21) Appl. No.: 15/531,176

(22) PCT Filed: Nov. 27, 2015

(86) PCT No.: PCT/IB2015/002223
§ 371 (c)(1),
(2) Date: May 26, 2017

(87) PCT Pub. No.: WO2016/083884
PCT Pub. Date: Jun. 2, 2016

(65) Prior Publication Data
US 2017/0326994 A1 Nov. 16, 2017

(30) Foreign Application Priority Data
Nov. 28, 2014 (JP) .................. 2014-241789

(51) Int. Cl.
*H02J 7/00* (2006.01)
*B60L 11/18* (2006.01)
(Continued)

(52) U.S. Cl.
CPC ............. *B60L 11/182* (2013.01); *B60L 53/12* (2019.02); *H01F 27/362* (2013.01);
(Continued)

(58) Field of Classification Search
CPC ......... B60L 11/182; H02J 50/10; H02J 50/12; H02J 5/005; H02J 7/025
(Continued)

(56) References Cited

U.S. PATENT DOCUMENTS

2008/0129246 A1 6/2008 Morita et al.
2013/0127409 A1 5/2013 Ichikawa
(Continued)

FOREIGN PATENT DOCUMENTS

JP 2008-120239 A 5/2008
JP 2013-063014 A 4/2013
(Continued)

OTHER PUBLICATIONS

Mar. 29, 2016 International Search Report issued in International Patent Application No. PCT/IB2015/002223.

*Primary Examiner* — Paul Dinh
(74) *Attorney, Agent, or Firm* — Oliff PLC

(57) ABSTRACT

A power reception apparatus to which power is transferred from a power transmission apparatus in a contactless manner includes: a ferrite provided in a plate shape and having a first principal face and a second principal face; an annular coil provided on the first principal face of the ferrite; and a shield provided on the second principal face of the ferrite, wherein an outer peripheral portion of the coil is placed on an inner side relative to an outer peripheral portion of the ferrite, such that part of the first principal face is exposed on an outer-peripheral-portion side of the ferrite, and an outer peripheral side of the shield includes a stepped portion provided at a position away from the second principal face of the ferrite,
(Continued)

such that part of the second principal face is exposed on the outer-peripheral -portion side of the ferrite.

10 Claims, 8 Drawing Sheets

(51) Int. Cl.
| | | |
|---|---|---|
| *H01F 27/36* | (2006.01) | |
| *H01F 38/14* | (2006.01) | |
| *H01M 10/46* | (2006.01) | |
| *B60L 53/12* | (2019.01) | |
| H02J 7/02 | (2016.01) | |
| H02J 50/10 | (2016.01) | |

(52) U.S. Cl.
CPC ........... *H01F 27/365* (2013.01); *H01F 38/14* (2013.01); *H01M 10/46* (2013.01); *B60L 2210/10* (2013.01); *B60L 2210/30* (2013.01); *B60L 2210/40* (2013.01); *B60L 2270/147* (2013.01); *H01M 2220/20* (2013.01); *H02J 7/025* (2013.01); *H02J 50/10* (2016.02); *Y02T 10/7005* (2013.01); *Y02T 10/7072* (2013.01); *Y02T 10/7216* (2013.01); *Y02T 10/7241* (2013.01); *Y02T 90/122* (2013.01); *Y02T 90/127* (2013.01); *Y02T 90/14* (2013.01)

(58) Field of Classification Search
USPC .................................................. 320/108–109
See application file for complete search history.

(56) References Cited

U.S. PATENT DOCUMENTS

| | | | |
|---|---|---|---|
| 2013/0181667 A1* | 7/2013 | Takeshita | .............. B60L 11/182 320/108 |
| 2013/0193749 A1 | 8/2013 | Nakamura et al. | |
| 2015/0008877 A1 | 1/2015 | Ichikawa et al. | |
| 2016/0181820 A1* | 6/2016 | Kautz | ................... B60L 11/182 307/104 |

FOREIGN PATENT DOCUMENTS

| | | |
|---|---|---|
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2013-175621 A | 9/2013 |
| JP | 2013-229988 A | 11/2013 |
| JP | 5592242 B2 | 9/2014 |

\* cited by examiner

POWER RECEPTION APPARATUS AND POWER TRANSMISSION APPARATUS

BACKGROUND OF THE INVENTION

1. Field of the Invention

The present invention relates to a power reception apparatus and a power transmission apparatus used in a power transfer system including the power reception apparatus that receives power from the power transmission apparatus in a contactless manner.

2. Description of Related Art

As a power transfer system using a power transmission apparatus and a power reception apparatus that transmit and receive power in a contactless manner, there are Japanese Patent Application Publication No. 2013-154815 (JP 2013-154815 A), Japanese Patent Application Publication No. 2013-146154 (JP 2013-146154 A), Japanese Patent Application Publication No. 2013-146148 (JP 2013-146148 A), Japanese Patent Application Publication No. 2013-110822 (JP 2013-110822 A), Japanese Patent Application Publication No. 2013-126327 (JP 2013-126327 A), Japanese Patent No. 5592242, and Japanese Patent Application Publication No. 2008-120239 (JP 2008-120239 A), and so on.

For example, a power reception apparatus described in Japanese Patent No. 5592242 includes an opening that is opened downward, a ferrite provided in a top plate of a shield, and a circular coil placed on a lower face of the ferrite.

Further, a power reception apparatus described in JP 2008-120239 A includes a substrate made of aluminum, a ferrite core provided on the substrate, and a coil wound around the ferrite core, and employs a configuration in which an outer periphery of the substrate overhangs an outer periphery of the ferrite core.

An outer peripheral end of the ferrite core employed in the power reception apparatus is placed on an inner side relative to an outer peripheral end of the shield in a plan view. That is, the outer peripheral end of the shield is placed on an outer side relative to the outer peripheral end of the ferrite core. On this account, at the time of power transfer in a power transfer system, a magnetic flux from the coil hits the shield, which may cause an eddy current loss. A power transmission apparatus may have a similar problem.

SUMMARY OF THE INVENTION

The present invention is accomplished in view of the above problem, and provides a power reception apparatus and a power transmission apparatus which can restrain interlinkage of a flux from a coil with the coil itself and a shield at the time of power transfer in a power transfer system and which can reduce an eddy current loss.

In view of this, one aspect of the present invention provides a power reception apparatus and a power transmission apparatus each including a ferrite, a coil, and a shield. The ferrite is provided in a plate shape and has a first principal face and a second principal face. The coil is provided on the first principal face of the ferrite and has an annular shape. The shield is provided on the second principal face of the ferrite. An outer peripheral portion of the coil is placed on an inner side relative to an outer peripheral portion of the ferrite, such that part of the first principal face is exposed on an outer-peripheral-portion side of the ferrite. An outer peripheral side of the shield includes a stepped portion provided at a position away from the second principal face of the ferrite, such that part of the second principal face is exposed on the outer-peripheral-portion side of the ferrite.

According to the configuration of the power reception apparatus and the power transmission apparatus as described above, on the outer-peripheral-portion side of the ferrite, a region in which part of the first principal face of the ferrite and part of the second principal face are exposed is provided on the outer-peripheral-portion side of the annular coil. Hereby, a magnetic flux generated from the coil is easily led to return to the ferrite from those exposed parts of the first principal face and the second principal face. Accordingly, it is possible to reduce an eddy current loss due to interlinkage of a magnetic flux generated from an inner-peripheral-portion side of the coil with the coil itself and the shield on the outer-peripheral-portion side of the coil. Particularly, since the stepped portion is placed between the second principal face of the ferrite and the shield, it is possible to restrain the magnetic flux to enter the second principal face from hitting the shield.

Accordingly, in a power transfer system using the power reception apparatus and the power transmission apparatus having the above-described structure, interlinkage of a magnetic flux from a coil with the coil itself and a shield is restrain at the time of power transfer. This accordingly makes it possible to reduce an eddy current loss.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
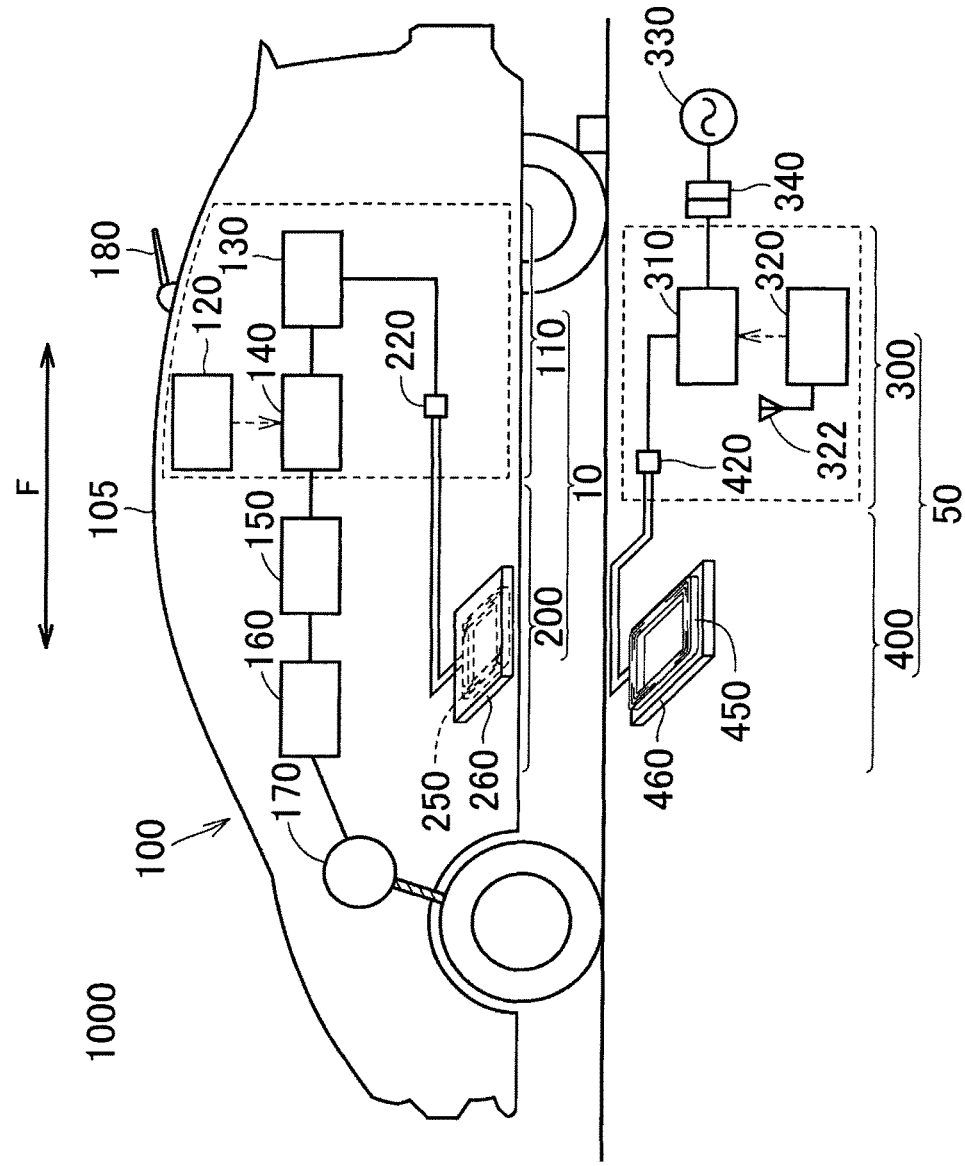
FIG. 1 is a view illustrating a power transfer system according to an embodiment as an example of the present invention.

The following describes an embodiment as an example based on the present invention, with reference to the drawings. Further, in a case where a number, an amount, and the like are mentioned in the embodiment described below, the scope of the present invention is not necessarily limited to the number, the amount, and the like, unless otherwise specified. The same reference numeral is assigned to the same component and its equivalent component, and redundant description may not be repeated. It is planned from the first to use configurations in the embodiment in combination appropriately. The drawings are not illustrated at an actual dimension ratio, but some of them are illustrated at a different ratio so as to facilitate understanding of a structure.

In each of the figures used below, a direction indicated by an arrow F therein indicates a vehicle front-rear direction including a forward direction and a reverse direction of a vehicle, and a direction indicated by an arrow W therein indicates a vehicle width direction including right and left directions of the vehicle, which are perpendicular to the vehicle front-rear direction.

Referring now to FIG. 1, the following describes a power transfer system 1000 for transferring power in a contactless manner. The power transfer system 1000 includes a power reception apparatus 10 to be provided in an electrically-driven vehicle 100, and a power transmission apparatus 50 placed on a facility-side such as a car park. The electrically-driven vehicle 100 includes the power reception apparatus 10 and a vehicle body 105.

The power reception apparatus 10 includes a coil unit 200 and an electric apparatus 110. The electric apparatus 110 is provided between the coil unit 200 and a battery 150 serving as a power storage device that stores power received by the coil unit 200. The coil unit 200 includes a coil 250 and a flat-shaped ferrite 260. In the present embodiment, a spiral coil having an appearance in a generally rectangularly annular shape is employed as the coil 250. The electric apparatus 110 includes a capacitor 120, a rectifier 130, a DC/DC converter 140, and so on. In the figure, the coil 250 is connected in series with a capacitor 220, but they may be connected in parallel with each other.

The vehicle body 105 includes the battery 150 connected to the DC/DC converter 140 of the electric apparatus 110, a power control unit 160, a motor unit 170, a communication portion 180, and so on.

A winding number of the coil 250 is set appropriately so that a distance between the coil 250 and the after-mentioned coil 450, a Q-value (e.g., Q≥100) indicative of a resonance strength between the coil 250 and the coil 450, a coupling coefficient (κ) indicative of a degree of coupling therebetween, and the like are large. The coil 250 is connected to the rectifier 130 via the capacitor 220. The rectifier 130 converts an alternating current supplied from the coil unit 200 into a direct current, and supplies it to the DC/DC converter 140.

The power transmission apparatus 50 includes a coil unit 400 and an electric apparatus 300. The coil unit 400 includes the coil 450 and a flat-shaped ferrite 460. In the present embodiment, a spiral coil having an appearance in a generally rectangularly annular shape is employed as the coil 450. The electric apparatus 300 includes a capacitor 420, a high-frequency power device 310, a power transmission ECU 320, and a communication portion 322. The electric apparatus 300 is detachably connected to an external alternating current power source 330 by use of a plug 340 or the like. In the figure, the coil 450 is connected in series with the capacitor 420, but they may be connected in parallel with each other.

The high-frequency power device 310 converts power received from the alternating current power source 330 into high-frequency power, and supplies the high-frequency power thus converted to the coil 450. The coil 450 transmits power to the coil 250 of the coil unit 200 by electromagnetic induction in a contactless manner.

Figure 2:
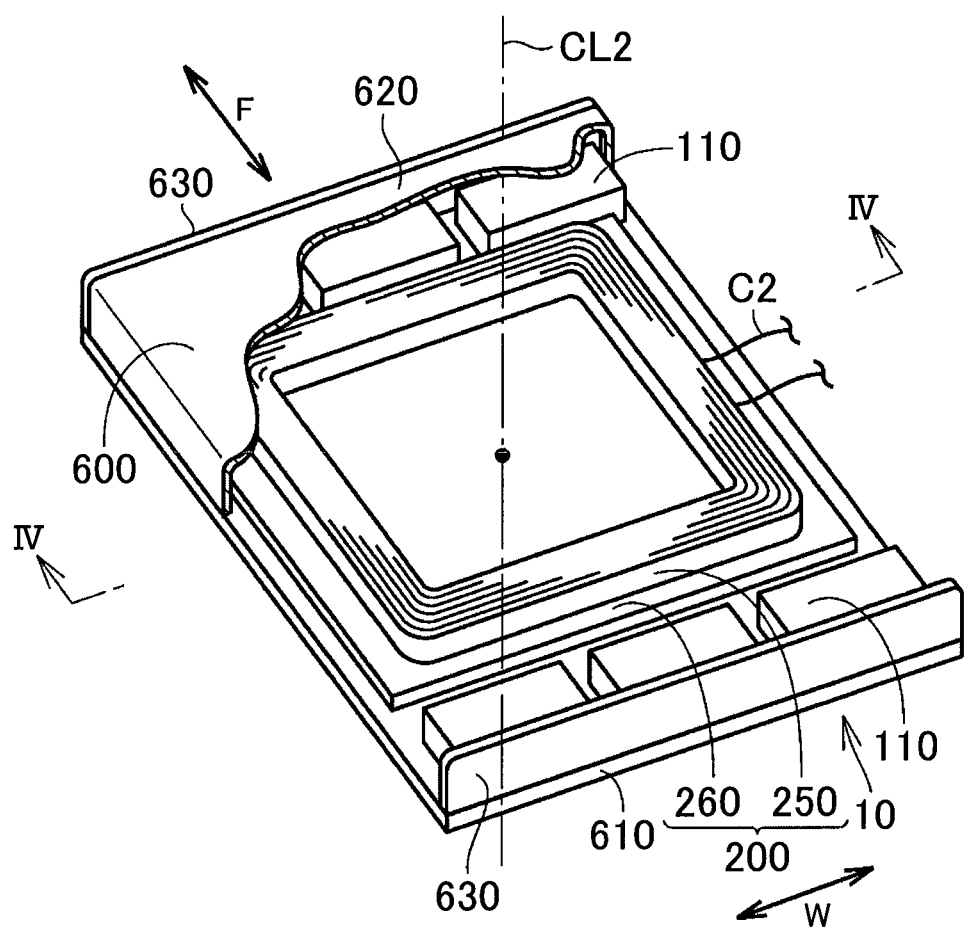
FIG. 2 is a perspective views illustrating a configuration of a power reception apparatus according to the embodiment.

Referring now to FIG. 2, a configuration of the power reception apparatus 10 in the present embodiment is described. FIG. 2 is a perspective view illustrating the configuration of the power reception apparatus 10. Note that the power reception apparatus 10 is generally provided on a bottom face of a vehicle and the coil 250 is placed so as to be opposed to the coil 450 (see FIG. 1). However, in FIG. 2, the power reception apparatus 10 is illustrated in an upside-down manner for purposes of the description.

As described above, the power reception apparatus 10 includes the coil unit 200 that receives power from the power transmission apparatus 50 in a contactless manner, and the electric apparatus 110 connected to the coil unit 200, and the coil unit 200 and the electric apparatus 110 are accommodated in a housing 600. Accordingly, the power reception apparatus 10 of the present embodiment has a configuration in which the coil unit 200 is integrated with the electric apparatus 110. The housing 600 includes a mounting wall 610, a cover member 620, and a side wall 630.

The coil 250 that employs a spiral coil has a rectangularly annular outer shape in which a coil wire C2 is wounded so as to surround a power-reception winding axis CL2 extending in an up-down direction of the vehicle. In the housing 600, the electric apparatus 110 is placed in the vehicle front-rear direction relative to the coil unit 200. In FIG. 2, the electric apparatus 110 is placed at two places in a divided manner in the front-rear direction, but the electric apparatus 110 may be placed on a front side or a rear side relative to the coil unit 200 in the vehicle front-rear direction or may be placed in the vehicle width direction.

Figure 3:
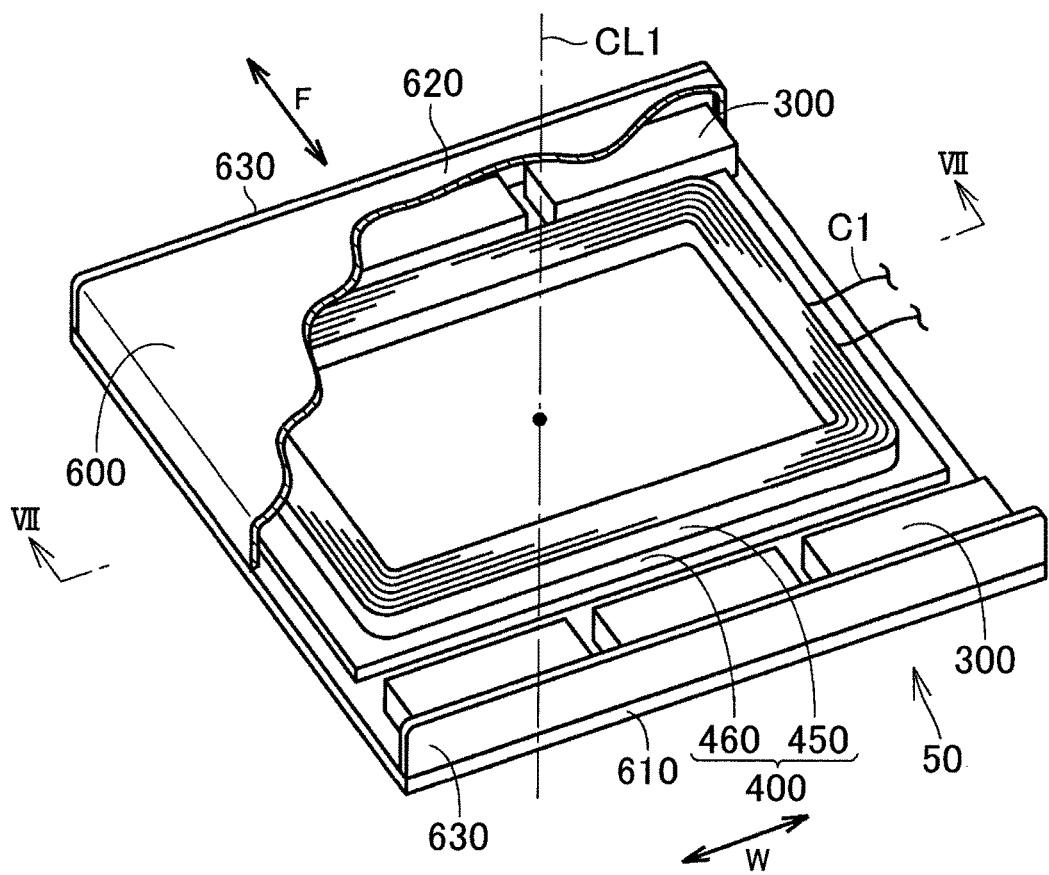
FIG. 3 is a perspective view illustrating a configuration of a power transmission apparatus according to the embodiment.

Referring now to FIG. 3, a configuration of the power transmission apparatus 50 in the present embodiment is described. FIG. 3 is a perspective view illustrating the configuration of the power transmission apparatus 50. The power transmission apparatus 50 includes the coil unit 400 that transmits power to the power reception apparatus 10 in a contactless manner as described above, and the electric apparatus 300 connected to the coil unit 400. The coil unit 400 and the electric apparatus 300 are accommodated in a housing 600. Accordingly, the power transmission apparatus 50 of the present embodiment has a configuration in which the coil unit 400 is integrated with the electric apparatus 300. The housing 600 includes a mounting wall 610, a cover member 620, and a side wall 630.

The coil 450 that employs a spiral coil has a rectangularly annular outer shape in which a coil wire C1 is wounded so as to surround a power-transmission winding axis CL1 extending in the up-down direction of the vehicle. In the housing 600, the electric apparatus 300 is placed in the vehicle front-rear direction relative to the coil unit 400. In FIG. 3, the electric apparatus 300 is placed at two places in a divided manner in the front-rear direction, but the electric apparatus 300 may be placed on a vehicle front side or a vehicle rear side relative to the coil unit 400 or may be placed in a width direction.

Figure 4:
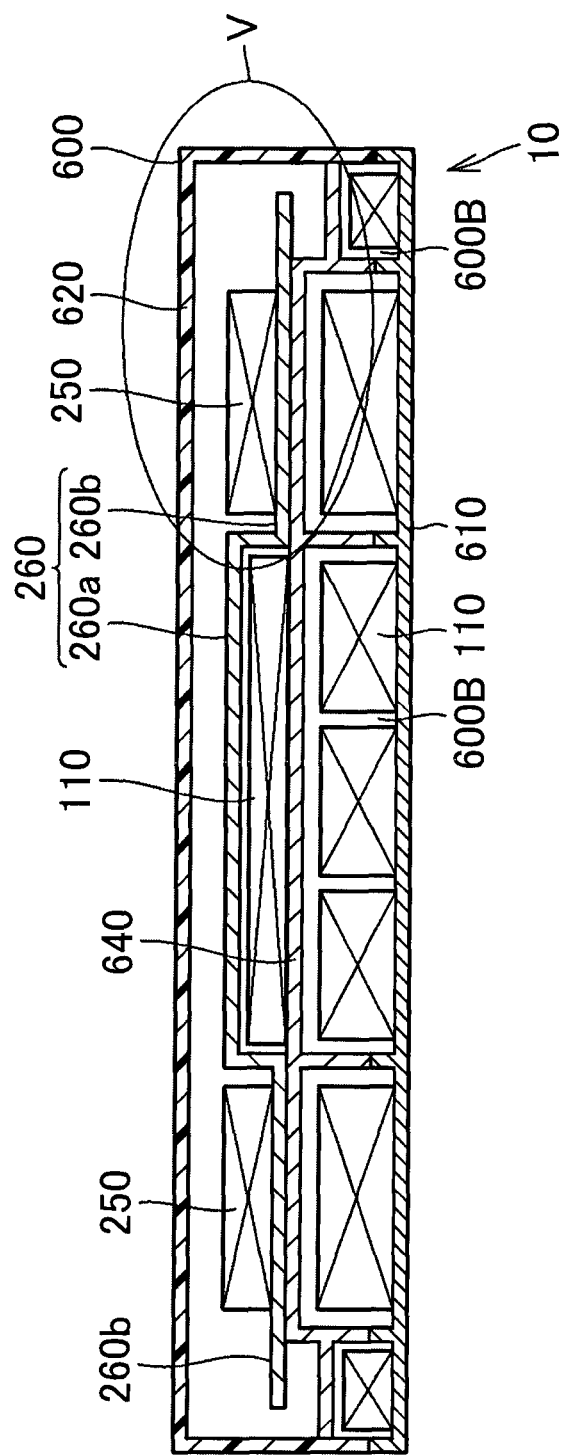
FIG. 4 is a sectional view taken along an arrow IV-IV in FIG. 2.
Figure 5:
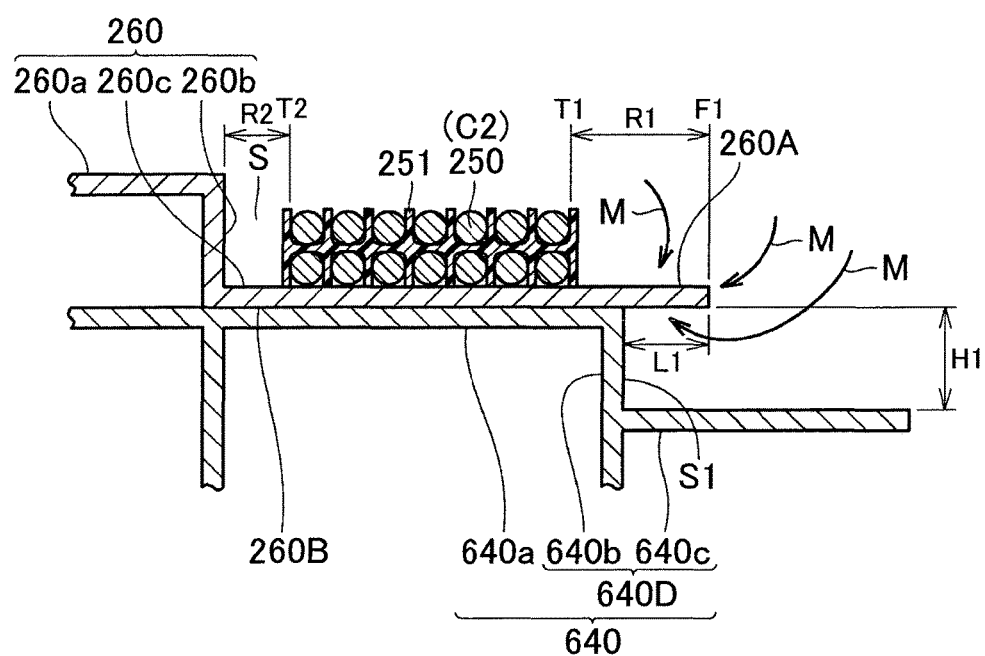
FIG. 5 is an enlarged sectional view of a region surrounded by V in FIG. 4.

Referring now to FIGS. 4 and 5, an internal configuration of the power reception apparatus 10 is described. FIG. 4 is a sectional view taken along an arrow IV-IV in FIG. 2, and FIG. 5 is an enlarged sectional view of a region surrounded by V in FIG. 4.

Referring now to FIGS. 4 and 5, the power reception apparatus 10 in the present embodiment is described. The power reception apparatus 10 includes the ferrite 260, the coil 250, and a shield 640. The ferrite 260 is formed in a rectangular shape and a plate shape in a plan view, and has a first principal face 260A (an upper side in the figure) and a second principal face 260B (a lower side in the figure). The coil 250 is provided on the first principal face 260A of the ferrite 260. The shield 640 is provided on the second principal face 260B of the ferrite 260.

The ferrite 260 is provided with a projection portion 260a projecting toward a first-principal-face-260A side. The coil 250 is disposed so as to surround an outer peripheral surface 260b of the projection portion 260a.

The coil 250 is configured such that the coil wire C2 is wound by use of a resin bobbin 251 so as to surround the power-reception winding axis CL2. A copper wire or the like is used as the coil wire C2.

The ferrite 260, the coil 250, and the shield 640 are accommodated in the housing 600. The housing 600 is constituted by the mounting wall 610 made of metal such as aluminum, and the resin cover member 620, and the resin side wall 630 (see FIG. 2) is placed in a vertical direction on a plane of paper. The shield 640 is made of a metal material such as aluminum or copper.

In the housing 600, a receptacle portion 600B is formed on that side of the shield 640 which is opposite to the ferrite 260, and the electric apparatus 110 is accommodated therein. Further, in the present embodiment, since the ferrite 260 is provided with the projection portion 260a projecting toward the first-principal-face-260A side, a predetermined space is also formed between the shield 640 and the projection portion 260a, so that the electric apparatus 110 may be placed in this region.

As illustrated in FIG. 5, an outer peripheral portion T1 of the coil 250 is placed on an inner side relative to an outer peripheral portion F1 of the ferrite 260, so that part of the first principal face 260A is exposed on an outer-peripheral-portion F1 side of the ferrite 260. Here, a position of the outer peripheral portion T1 of the coil 250 indicates an outermost position of the coil wire C2 that is placed on an outermost circumference, except a thickness of the bobbin 251.

Further, in the shield 640, an outer peripheral side of the shield 640 includes a stepped portion 640D provided at a position away from the second principal face 260B of the ferrite 260 and extending from a shield main body 640a. Accordingly, part of the second principal face 260B is exposed on the outer-peripheral-portion-F1 side of the ferrite 260.

Thus, on the outer-peripheral-portion side of the ferrite 260, a region in which part (with a length R1) of the first principal face 260A of the ferrite 260 and part (with a length L1) of the second principal face 260B are exposed is formed on the outer-peripheral-portion side of the annular coil 250. Hereby, a magnetic flux M generated from the coil 250 is easily led to return to the ferrite 260 from those exposed parts of the first principal face 260A and the second principal face 260B. Accordingly, it is possible to reduce an eddy current loss due to interlinkage of a magnetic flux generated from an inner-peripheral-portion side of the coil 250 with the coil 250 itself and the shield 640 on the outer-peripheral-portion side of the coil 250.

Figure 6:
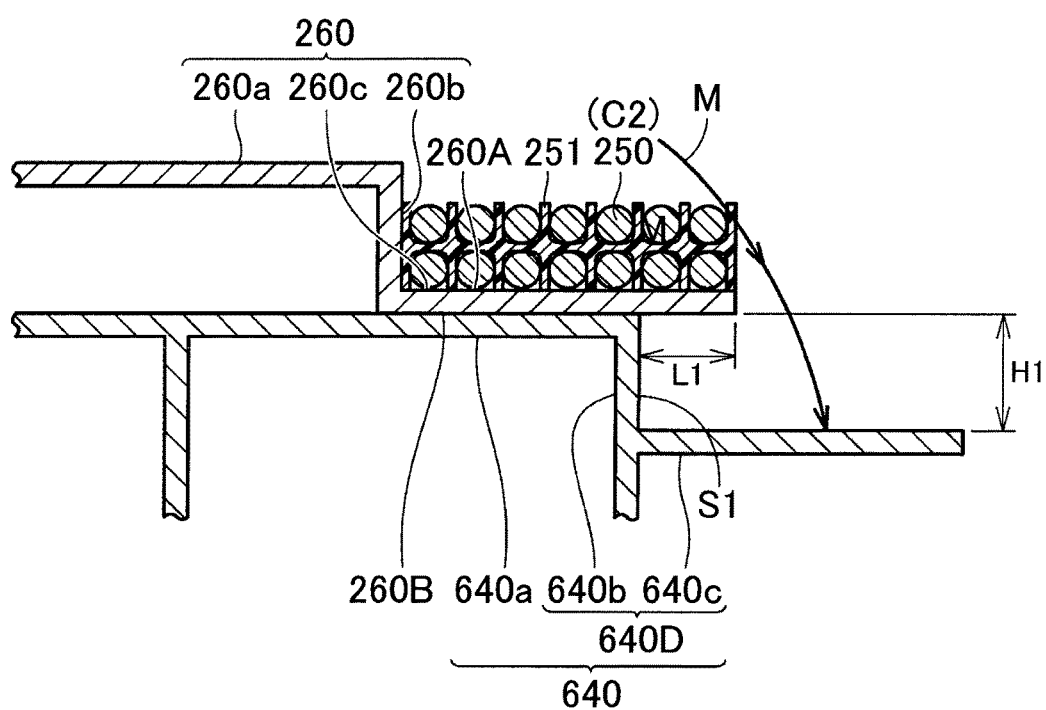
FIG. 6 is an enlarged sectional view in the related art and corresponds to the region surrounded by V in FIG. 4.

For example, as illustrated in FIG. 6, in a case where the outer peripheral portion T1 of the coil 250 and the outer peripheral portion F1 of the ferrite 260 are made flush with each other (T1 accords with F1), a magnetic flux M generated from the inner-peripheral-portion side of the coil 250 interlinks with the coil 250 itself and the shield 640 in the outer-peripheral-portion side of the coil 250. This accordingly causes an eddy current loss.

As illustrated in FIG. 5, in the present embodiment, a region in which part (with a length R1) of the first principal face 260A of the ferrite 260 and part (with a length L1) of the second principal face 260B are exposed is formed in the outer-peripheral-portion side of the annular coil 250. This accordingly reduces flux linkages with the coil 250 and the shield 640, thereby making it possible to restrain a decrease in a Q-value indicative of a resonance strength between the coil 250 and the coil 450.

Further, with reference to FIG. 5, the stepped portion 640D includes a vertical wall 640b and an extending part 640c. The vertical wall 640b extends in a direction away from the second principal face 260B of the ferrite 260. The extending part 640c extends from the vertical wall 640b in parallel with the shield main body 640a. The outer peripheral portion T1 of the coil 250 is placed on an inner side relative to a position Si where the vertical wall 640b is provided. This increases a region where the first principal face 260A of the ferrite 260 is exposed. This accordingly allows the magnetic flux to enter the ferrite 260 successfully, thereby making it possible to restrain occurrence of leakage of the magnetic flux.

Further, an area where the first principal face 260A of the ferrite 260 is exposed on an outer peripheral side of the coil 250 is wider than an area where the second principal face is exposed from the shield. This makes it possible to restrain a magnetic flux amount to enter from a second-principal-face-260B side and to reduce a magnetic flux amount to enter the extending part 640c.

Further, a vertical wall length H1 of the vertical wall 640b may be not less than a ferrite exposure length L1 from the vertical wall 640b to the outer peripheral portion F1 of the ferrite 260. Hereby, even in a case where the magnetic flux M goes around to a second-principal-face-260B side of the ferrite 260 from an outside of the outer peripheral portion F1 of the ferrite 260, it is possible to avoid interlinkage with the extending part 640c of the shield 640.

Generally a region where a magnetic field strength becomes high on a second-principal-face side is within an arc of a radius L1 around an outer peripheral edge of the ferrite. Accordingly, by setting the vertical wall length H1 to be not less than the ferrite exposure length L1, it is possible to restrain a region having a high magnetic field strength from reaching the shield 640.

In the meantime, the vertical wall length H1 of the vertical wall 640b may be not more than the ferrite exposure length L1 from the vertical wall 640b to the outer peripheral portion F1 of the ferrite 260. This restrains a height of the shield 640, thereby making it possible to restrain a thickness (height) of the housing 600. Further, in a case where the height of the housing 600 is a determined height, it is possible to increase a space capacity of the receptacle portion 600B below the extending part 640c of the shield 640 by restraining the vertical wall length H1 to be small.

Further, a gap S where the first principal face 260A of the ferrite 260 is partially exposed may be provided between the outer peripheral surface 260b of the ferrite 260 and the inner peripheral portion T2 of the coil 250. A length R2 of the gap S may be not less than the length R1 of an exposed part of the first principal face 260A on the outer-peripheral-portion-F1 side of the ferrite 260. This makes it possible to successfully secure a magnetic path emitted from the coil 250.

Note that the ferrite 260 employs a configuration in which the projection portion 260a projecting toward the first-principal-face-260A side is provided, but the ferrite 260 is not necessarily limited to this configuration and may be a flat-shaped ferrite.

Note that the present embodiment is illustrated such that the shield makes contact with the ferrite. However, an insulating member may be placed between the shield and the ferrite. This makes it possible to restrain a magnetic flux flowing through the ferrite from entering the shield, thereby making it possible to achieve loss reduction.

Figure 7:
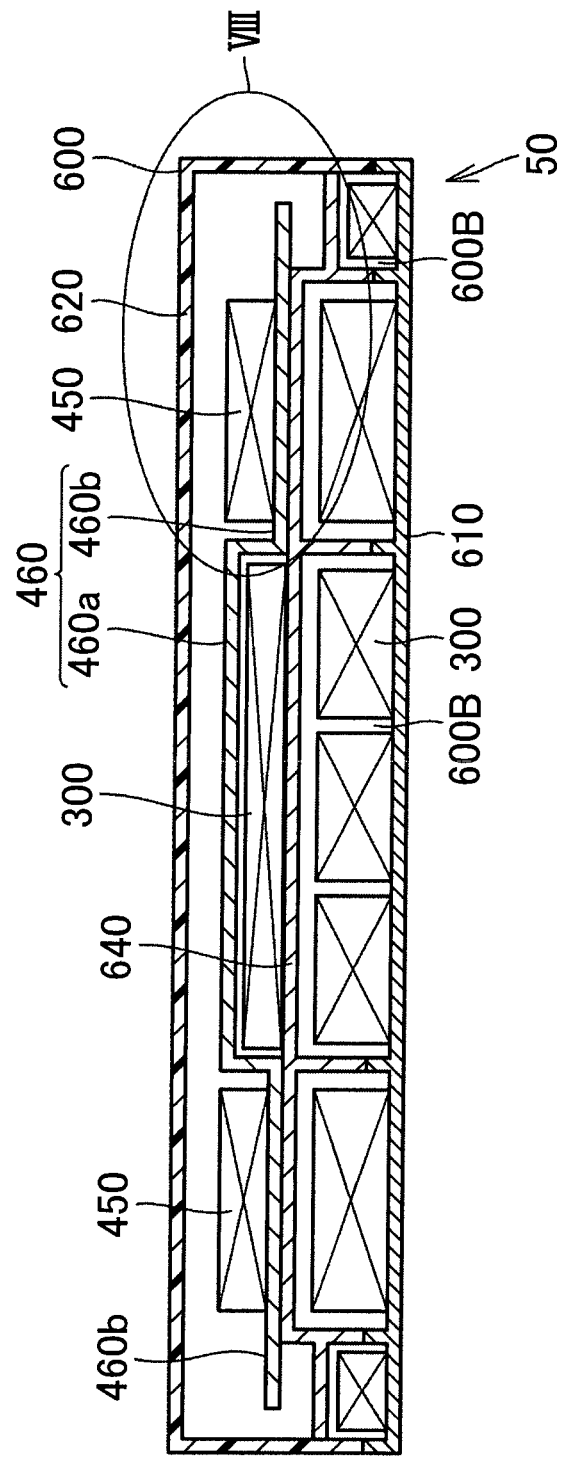
FIG. 7 is a sectional view taken along an arrow VII-VII in FIG. 3.
Figure 8:
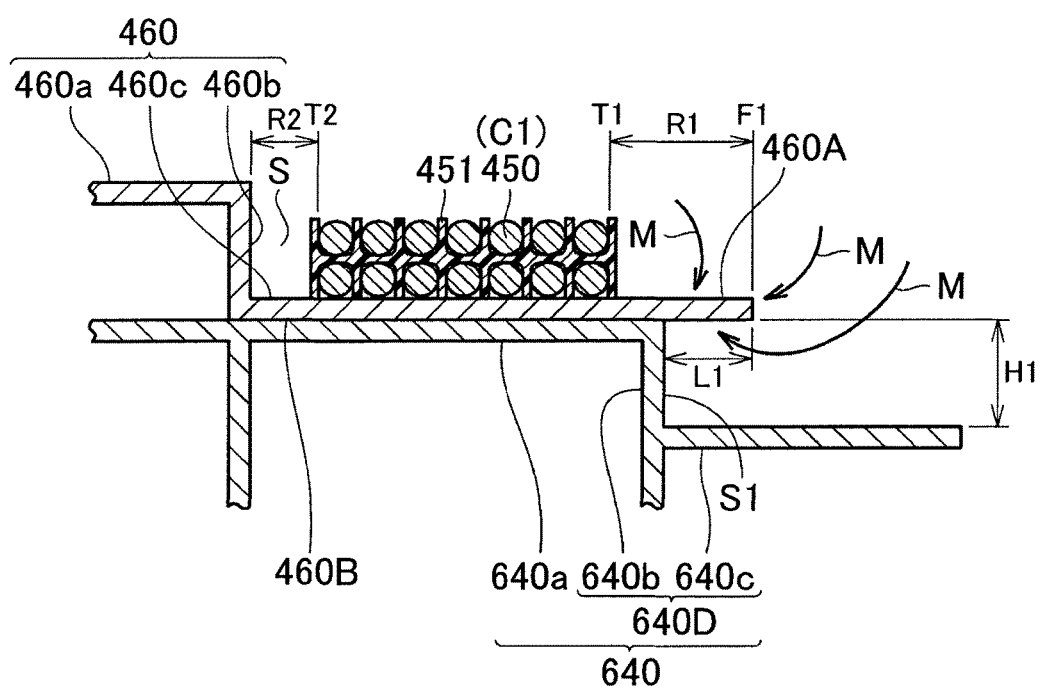
FIG. 8 is an enlarged sectional view of a region surrounded by VIII in FIG. 7.

Referring now to FIGS. 7 and 8, an internal configuration of the power transmission apparatus 50 is described. FIG. 7 is a sectional view taken along an arrow VII-VII in FIG. 3, and FIG. 8 is an enlarged sectional view of a region surrounded by VIII in FIG. 7.

Referring now to FIGS. 7 and 8, the power transmission apparatus 50 in the present embodiment is described. The power transmission apparatus 50 is formed in a rectangular shape and a plate shape in a plan view. The power transmission apparatus 50 includes the ferrite 460, the annular coil 450, and a shield 640. The ferrite 460 has a first principal face 460A (an upper side in the figure) and a second principal face 460B (a lower side in the figure). The coil 450 is provided on the first principal face 460A of the ferrite 460. The shield 640 is provided on the second principal face 460B of the ferrite 460.

The ferrite 460 is provided with a projection portion 460a projecting toward a first-principal-face-460A side. The coil 450 is disposed so as to surround an outer peripheral surface 460b of the projection portion 460a.

The coil 450 is configured such that the coil wire C1 is wound by use of a resin bobbin 451 so as to surround the power-transmission winding axis CL1. A copper wire or the like is used as the coil wire C1.

The ferrite 460, the coil 450, and the shield 640 are accommodated in the housing 600. The housing 600 is constituted by the mounting wall 610 made of metal such as aluminum, and the resin cover member 620, and the resin side wall 630 (see FIG. 3) is placed in a vertical direction on a plane of paper. The shield 640 is made of a metal material such as aluminum or copper.

In the housing 600, a receptacle portion 600B is formed on that side of the shield 640 which is opposite to the ferrite 460, and the electric apparatus 300 is accommodated therein. Further, in the present embodiment, the ferrite 460 is provided with the projection portion 460a projecting toward the first-principal-face-460A side. Accordingly, a predetermined space is formed between the shield 640 and the projection portion 460a, so that the electric apparatus 300 may be placed in this region.

As illustrated in FIG. 5, an outer peripheral portion T1 of the coil 450 is placed on an inner side relative to an outer peripheral portion F1 of the ferrite 460, so that part of the first principal face 460A is exposed on an outer-peripheral-portion F1 side of the ferrite 460. Here, a position of the outer peripheral portion T1 of the coil 450 indicates an outermost position of the coil wire C1 that is placed on an outermost circumference, except a thickness of the bobbin 451.

Further, in the shield 640, an outer peripheral side of the shield 640 includes a stepped portion 640D provided at a position away from the second principal face 460B of the ferrite 460 and extending from a shield main body 640a. Accordingly, part of the second principal face 460B is exposed on the outer-peripheral-portion-F1 side of the ferrite 460.

Thus, on the outer-peripheral-portion side of the ferrite 460, a region in which part (with a length R1) of the first principal face 460A of the ferrite 460 and part (with a length L1) of the second principal face 460B are exposed is formed on the outer-peripheral-portion side of the annular coil 450. Hereby, a magnetic flux M generated from the coil 450 is easily led to return to the ferrite 460 from those exposed parts of the first principal face 460A and the second principal face 460B. Accordingly, it is possible to reduce an eddy current loss due to interlinkage of a magnetic flux generated from an inner-peripheral-portion side of the coil 450 with the coil 450 itself and the shield 640 on the outer-peripheral-portion side of the coil 450.

As illustrated in FIG. 8, a region in which part (with a length R1) of the first principal face 460A of the ferrite 460 and part (with a length L1) of the second principal face 460B are exposed is formed on the outer-peripheral-portion side of the annular coil 450. This accordingly reduces flux linkages with the coil 450 and the shield 640, thereby making it possible to restrain a decrease in a Q-value indicative of a resonance strength between the coil 250 and the coil 450.

Further, with reference to FIG. 8, the following describes the stepped portion 640D. The stepped portion 640D includes a vertical wall 640b and an extending part 640c, and the outer peripheral portion T1 of the coil 450 is placed on an inner side relative to a position Si where the vertical wall 640b is provided. The vertical wall 640b extends in a direction away from the second principal face 460B of the ferrite 460. The extending part 640c extends from the vertical wall 640b in parallel with the shield main body 640a. This increases a region where the first principal face 460A of the ferrite 460 is exposed, so that the magnetic flux successfully enters the ferrite 460. This accordingly makes it possible to restrain occurrence of leakage of the magnetic flux.

Further, a vertical wall length H1 of the vertical wall 640b may be not less than a ferrite exposure length L1 from the vertical wall 640b to an outer peripheral portion F1 of the ferrite 460. Hereby, even in a case where the magnetic flux M goes around to a second-principal-face-460B side of the ferrite 460 from an outside of the outer peripheral portion F1 of the ferrite 460, it is possible to avoid interlinkage with the extending part 640c of the shield 640.

In the meantime, the vertical wall length H1 of the vertical wall 640b may be not more than the ferrite exposure length L1 from the vertical wall 640b to the outer peripheral portion F1 of the ferrite 460. This restrains a height of the shield 640, thereby making it possible to restrain a thickness (height) of the housing 600. Further, it is possible to increase a space capacity of the receptacle portion 600B below the extending part 640c of the shield 640.

Further, a gap S where the first principal face 460A of the ferrite 460 is partially exposed may be provided between the outer peripheral surface 460b of the ferrite 460 and the inner peripheral portion T2 of the coil 450. A length R2 of the gap S may be not less than a length R1 of an exposed part of the first principal face 460A on an outer-peripheral-portion-F1 side of the ferrite 460. This makes it possible to successfully secure a magnetic path emitted from the coil 450.

Note that the ferrite 460 employs a configuration in which the projection portion 460a projecting toward the first-principal-face-460A side is provided, but the ferrite 460 is not necessarily limited to this configuration and may be a flat-shaped ferrite.

The embodiment has been described above, but the embodiment described herein is just an example in all respects and is not limitative. A technical scope of the present invention is shown by Claims, and intended to include all modifications made within the meaning and scope equivalent to Claims.

The invention claimed is:

1. A power reception apparatus to which power is transferred from a power transmission apparatus in a contactless manner, the power reception apparatus comprising:
   a ferrite provided in a plate shape, the ferrite having a first principal face and a second principal face;

a coil provided on the first principal face of the ferrite, the coil having an annular shape; and a shield provided on the second principal face of the ferrite, wherein:

an outer peripheral portion of the coil is placed on an inner side relative to an outer peripheral portion of the ferrite, such that part of the first principal face is exposed on an outer-peripheral-portion side of the ferrite; and an outer peripheral side of the shield includes a stepped portion provided at a position away from the second principal face of the ferrite, such that part of the second principal face is exposed on the outer-peripheral-portion side of the ferrite.

2. The power reception apparatus according to claim 1, wherein:

the stepped portion includes a vertical wall extending in a direction away from the second principal face of the ferrite; and the outer peripheral portion of the coil is placed on an inner side relative to a position where the vertical wall is provided.

3. The power reception apparatus according to claim 1, wherein:

the stepped portion includes a vertical wall extending in a direction away from the second principal face of the ferrite; and a length of the vertical wall is not less than an exposure length of the ferrite from the vertical wall to the outer peripheral portion of the ferrite.

4. The power reception apparatus according to claim 1, further comprising:

a housing configured to accommodate the ferrite, the coil, and the shield, the housing- being provided with a receptacle portion configured to accommodate a device placed on the side of the shield which is opposite to the ferrite, wherein a length of a vertical wall is not more than an exposure length of the ferrite from the vertical wall to the outer peripheral portion of the ferrite.

5. The power reception apparatus according to claim 1, wherein:

the ferrite is provided with a projection portion projecting toward a first-principal-face side;

the coil is disposed so as to surround an outer peripheral surface of the projection portion;

a gap where part of the first principal face of the ferrite is exposed is provided between the outer peripheral surface and an inner peripheral portion of the coil; and a length of the gap is not less than a length of an exposed part of the first principal face on the outer-peripheral-portion side of the ferrite.

6. A power transmission apparatus configured to transfer power to a power reception apparatus in a contactless manner, the power transmission apparatus comprising:

a ferrite provided in a plate shape, the ferrite having a first principal face and a second principal face;

a coil provided on the first principal face of the ferrite, the coil having an annular shape; and a shield provided on the second principal face of the ferrite, wherein:

an outer peripheral portion of the coil is placed on an inner side relative to an outer peripheral portion of the ferrite, such that part of the first principal face is exposed on an outer-peripheral-portion side of the ferrite; and an outer peripheral side of the shield includes a stepped portion provided at a position away from the second principal face of the ferrite, such that part of the second principal face is exposed on the outer-peripheral-portion side of the ferrite.

7. The power transmission apparatus according to claim 6, wherein:

the stepped portion includes a vertical wall extending in a direction away from the second principal face of the ferrite; and the outer peripheral portion of the coil is placed on an inner side relative to a position where the vertical wall is provided.

8. The power transmission apparatus according to claim 6, wherein:

the stepped portion includes a vertical wall extending in a direction away from the second principal face of the ferrite; and a length of the vertical wall is not less than an exposure length of the ferrite from the vertical wall to the outer peripheral portion of the ferrite.

9. The power transmission apparatus according to claim 6, further comprising:

a housing configured to accommodate the ferrite, the coil, and the shield, the housing- being provided with a receptacle portion configured to accommodate a device placed on the side of the shield which is opposite to the ferrite, wherein a length of a vertical wall is not more than an exposure length of the ferrite from the vertical wall to the outer peripheral portion of the ferrite.

10. The power transmission apparatus according to claim 6, wherein:

the ferrite is provided with a projection portion projecting toward a first-principal-face side;

the coil is disposed so as to surround an outer peripheral surface of the projection portion;

a gap where part of the first principal face of the ferrite is exposed is provided between the outer peripheral surface and an inner peripheral portion of the coil; and a length of the gap is not less than a length of an exposed part of the first principal face on the outer-peripheral-portion side of the ferrite.

* * * * *